N. NILSON.
SCALE.
APPLICATION FILED FEB. 15, 1910.

1,022,376.

Patented Apr. 2, 1912.
2 SHEETS—SHEET 1.

WITNESSES

INVENTOR
NILS NILSON
BY Paul & Paul
ATTORNEYS

N. NILSON.
SCALE.
APPLICATION FILED FEB. 15, 1910.

1,022,376.

Patented Apr. 2, 1912.

2 SHEETS—SHEET 2.

WITNESSES

INVENTOR
NILS NILSON
BY Paul O'Reil
ATTORNEYS

UNITED STATES PATENT OFFICE.

NILS NILSON, OF WAYZATA, MINNESOTA.

SCALE.

1,022,376. Specification of Letters Patent. Patented Apr. 2, 1912.

Application filed February 15, 1910. Serial No. 544,114.

*To all whom it may concern:*

Be it known that I, NILS NILSON, of Wayzata, Hennepin county, Minnesota, have invented certain new and useful Improvements in Scales, of which the following is a specification.

The primary object of my invention is to provide a scale with a connection between the indicator hand and the beam which will permit the location of the scale platform on the opposite side of the beam pivot.

A further object of my invention is to provide a simple, economical mechanism through which the movement of the scale beam will be transmitted to the indicator hand.

Other objects of the invention will appear from the following detailed description.

The invention consists generally in various constructions and combinations, all as hereinafter described and particularly pointed out in the claims.

Figure 1:
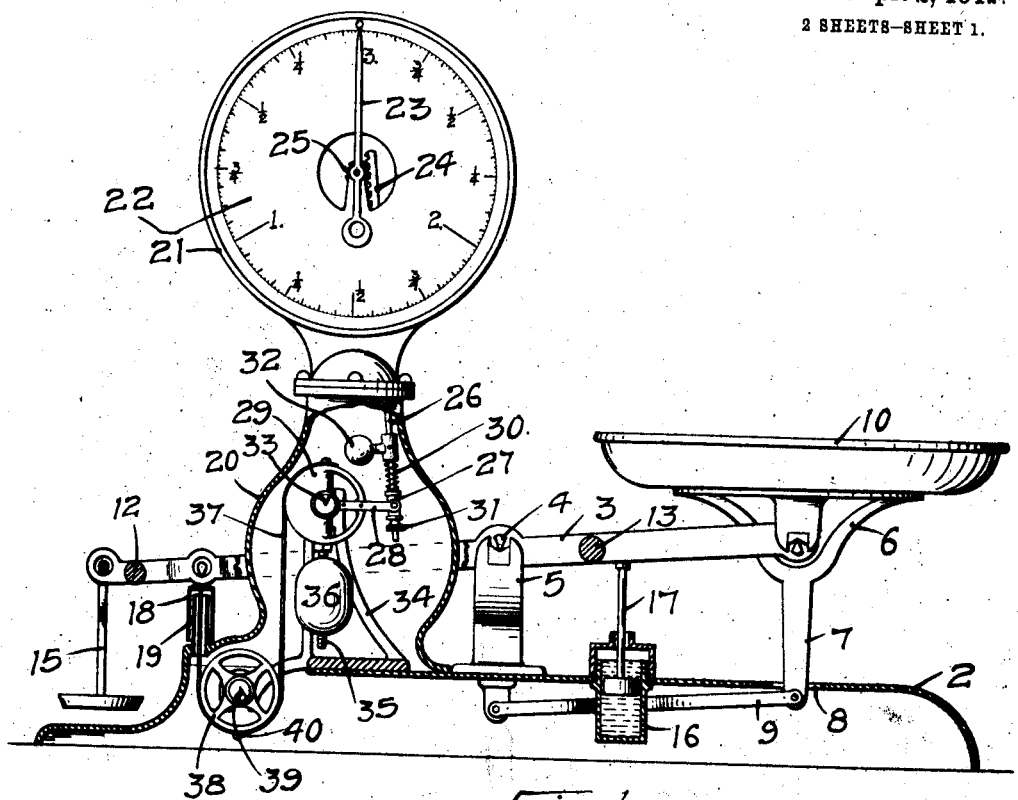
Figure 2:
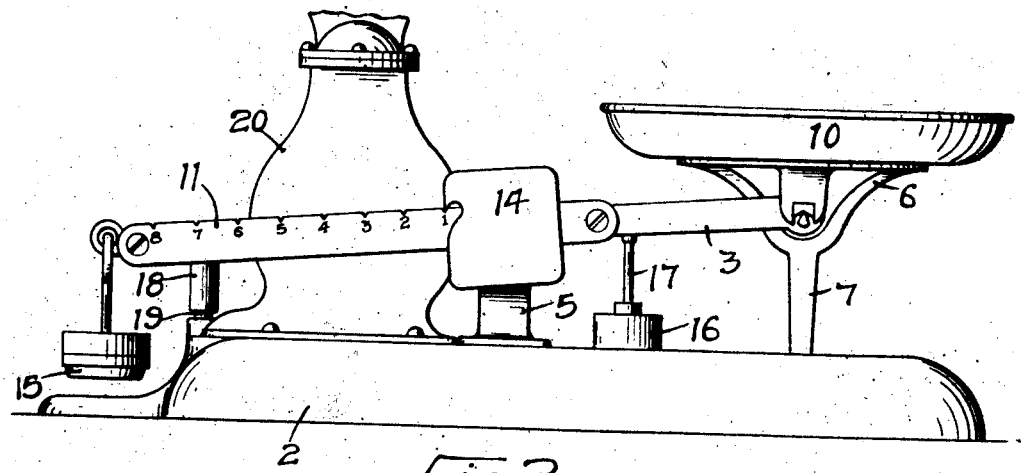
Figure 3:
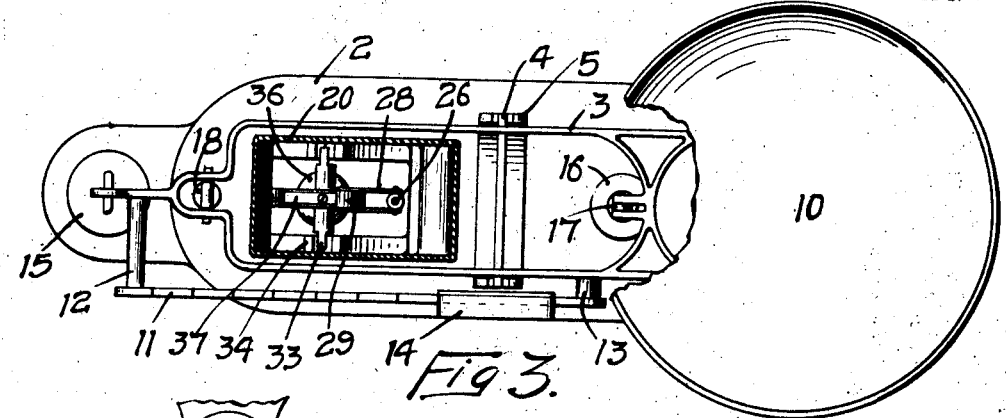
Figure 5:
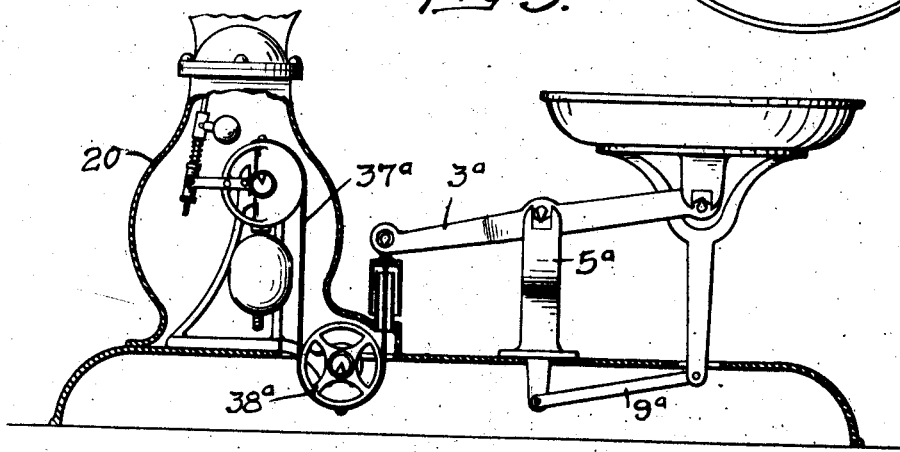
Figure 4:
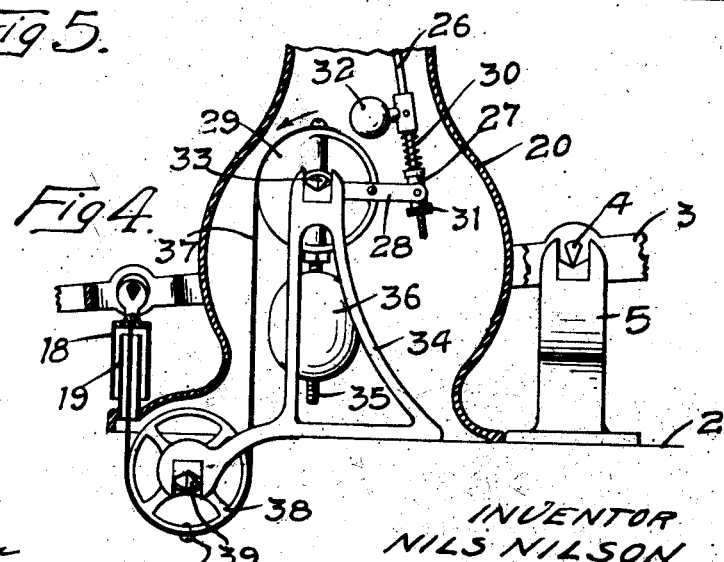

In the accompanying drawings forming part of this specification, Figure 1 is a front view, partially in section, of a scale embodying my invention, Fig. 2 is a side elevation with the upper portion or dial of the scale broken away, Fig. 3 is a plan view, Fig. 4 is an enlarged detail view showing the connecting mechanism between the beam and the indicator, Fig. 5 is a view similar to Fig. 1, illustrating the lower portion of the scale with a modified construction of beam.

In the drawing, 2 represents the base of the scale, 3 is a frame having knife edge pivots 4 on a standard 5. A scale platform 6 is provided at one end of the frame 3 and has a depending end 7 that is movable in a slot 8 in the base 2 and is connected by a link 9 with a fixed point on said base. A pan 10 is mounted on the said platform to receive the article to be weighed. A graduated beam 11 is supported by studs 12 and 13 on one side of the frame 3 and is provided with a movable weight 14. The end of the frame 3 opposite from the pan 10 is provided with a weight hanger 15. A dash pot 16 has a plunger 17 connected with the frame 3 on one side of the pivot 4 and a cup 18 is pivotally connected with the frame on the other side of the pivot and is adapted to telescope with a sleeve 19. A housing 20 is mounted on one end of the base and supports a dial case 21 containing a dial 22 and an indicator hand 23. A toothed bar 24 engages a pinion 25 on the axis of the indicator hand for actuating the same. The lower end of said bar has a rod 26 slidable in bearings 27 that are carried by arms 28 secured to a wheel 29. A spring 30 is mounted on the rod 26 and a thumb nut 31, fitting the threaded end of the rod, permits its adjustment lengthwise against the tension of the spring. The weight 32 tends to hold the toothed bar in engagement with the pinion. The wheel 29 has knife edge bearings 33 in brackets 34 and is provided with a threaded rod 35 whereon a balance weight 36 is mounted. A flexible connection, such as a ribbon 37, is attached to the periphery of the wheel 29. This flexible connection extends down under the wheel 38 that is pivoted at 39 in the base 2, and said ribbon is secured to said wheel 38 at 40 and extends therefrom up through the sleeve 19 and the cup 18 and is attached to the frame 3, the telescoping sleeve and cup serving to exclude dust from the operating mechanism.

From the foregoing construction it will be noted that the scale platform is located on the opposite side of the beam pivot from the connection of the beam with the indicator hand and this arrangement necessitates the additional wheel under which the flexible connection passes before being attached to the scale beam. Obviously if the ribbon 37 were attached directly to the beam near the upper wheel, the depression of the scale pan 10 would have no effect whatever upon the indicator, as the flexible connection would be made slack instead of being drawn taut to oscillate the wheel 29. By providing the second wheel this difficulty is avoided and accurate weighing accomplished with the scale pan located on the opposite side of the beam pivot from the connection of the beam with the indicator hand.

In Fig. 5 I have shown a modified construction which consists in providing a short beam 3ª pivoted on a standard 5ª, the depending end of the scale platform being connected by a link 9ª with a depending portion of the standard 5ª. The wheel 38ª and a flexible connection 37ª are substantially the same as shown in Fig. 1, except they are transposed in position to the other side of the housing 20 and their functions are substantially the same as heretofore described with reference to Figs. 1 and 4.

I claim as my invention:—

1. In a scale, the combination, with a base and a scale beam mounted thereon, of a scale platform carried by one end of said beam on one side of its pivot, a dial, an indicator hand therefor, a wheel mounted on said base, means operatively connecting said wheel with said indicator hand, said wheel having a counter-poise weight, a second wheel supported on said base, flexible means attached to the periphery of said first named wheel and extending under said second named wheel and bearing thereon and attached to said scale beam on the opposite side of the pivot of said beam from said scale platform.

2. In a scale, the combination, with a base and a scale beam pivoted thereon, of a scale platform supported on said beam on one side of its pivot, a dial mounted on said base, an indicator hand, a counter-poise wheel supported on said base, means operatively connecting said counter-poise wheel with said indicator hand, a second wheel supported on said base beneath said first named wheel, and a flexible ribbon attached to the periphery of said first named wheel and passing under said second named wheel and secured thereto and connected to said scale beam on the opposite side of its pivot from said platform.

3. A scale comprising a base, a scale beam pivoted thereon, a scale platform carried by said beam on one side of its pivot, a counter-poise wheel mounted on said base, a dial, an indicator hand therefor, means operatively connecting said indicator hand with said counter-poise wheel, a second wheel supported on said base and of substantially the same diameter as said first named wheel, and flexible means attached to the periphery of said first named wheel and extending under said second named wheel and secured thereto and attached to said beam, substantially as described.

In witness whereof, I have hereunto set my hand this 9th day of February 1910.

NILS NILSON.

Witnesses:
RICHARD PAUL,
L. C. CRONEN.